US011547053B2

(12) United States Patent
Lammerant et al.

(10) Patent No.: US 11,547,053 B2
(45) Date of Patent: Jan. 10, 2023

(54) AGRICULTURAL VEHICLE WITH WINDGUARD HAVING OFFSET ARMS

(71) Applicant: CNH Industrial America LLC, New Holland, PA (US)

(72) Inventors: Eddy Roland Lammerant, Koksijde (BE); Jonathan Shenk, Lititz, PA (US); Chandrashekhar Singh, Lancaster, PA (US); Enrico Giuliani, Russi-Ra (IT)

(73) Assignee: CNH Industrial America LLC, New Holland, PA (US)

( * ) Notice: Subject to any disclaimer, the term of this patent is extended or adjusted under 35 U.S.C. 154(b) by 385 days.

(21) Appl. No.: 16/808,804

(22) Filed: Mar. 4, 2020

(65) Prior Publication Data

US 2021/0274716 A1    Sep. 9, 2021

(51) Int. Cl.
*A01D 89/00* (2006.01)
*A01F 15/10* (2006.01)

(52) U.S. Cl.
CPC ............ *A01D 89/008* (2013.01); *A01F 15/10* (2013.01)

(58) Field of Classification Search
CPC ...... A01D 89/008; A01F 15/10; A01F 15/106
See application file for complete search history.

(56) References Cited

U.S. PATENT DOCUMENTS

| 2,430,734 | A | * | 11/1947 | Raney ...................... A01F 15/10 56/364 |
| 2,481,244 | A | * | 9/1949 | Russell ................... A01F 15/10 198/817 |
| 2,859,688 | A | * | 11/1958 | Nolt ....................... A01F 15/101 100/142 |
| 2,872,772 | A | * | 2/1959 | Nolt ....................... A01D 89/008 56/364 |
| 3,924,391 | A | * | 12/1975 | Cheatum ................. A01F 15/08 56/364 |
| 4,411,127 | A |   | 10/1983 | Diederich, Jr. et al. |
| 5,293,730 | A |   | 3/1994 | Bich et al. |
| 6,079,194 | A |   | 6/2000 | Waldrop |
| 6,314,709 | B1 |   | 11/2001 | McClure et al. |

(Continued)

FOREIGN PATENT DOCUMENTS

| EP | 0 567 192 A1 | 10/1993 | |
| EP | 2777379 A1 * | 9/2014 | ........... A01D 34/001 |
| WO | WO-2013053682 A1 * | 4/2013 | ........... A01D 89/002 |

*Primary Examiner* — Arpad F Kovacs
(74) *Attorney, Agent, or Firm* — Peter Zacharias; Patrick Sheldrake

(57) ABSTRACT

A feeding assembly includes: a frame; a pickup assembly carried by the frame and including a pickup roll, a plurality of tines carried by the pickup roll, and a pair of end flares, each of the end flares being disposed adjacent to a respective lateral end of the pickup roll and configured to redirect crop material picked up by the tines as the pickup roll rotates; and a windguard assembly including a windguard roll coupled to the frame by a pair of arm assemblies. Each of the arm assemblies includes: a first arm pivotably coupled to the frame; a second arm coupled to the first arm and the windguard roll; and an arm connector coupling the first arm to the second arm such that the second arm is laterally offset relative to the first arm and is positioned laterally between a pair of vertical planes defined by the end flares.

16 Claims, 6 Drawing Sheets

(56) References Cited

U.S. PATENT DOCUMENTS

| | | | |
|---|---|---|---|
| 6,877,304 B1 | 4/2005 | Smith et al. | |
| 7,617,662 B2 | 11/2009 | Erdmann et al. | |
| 7,650,741 B2 | 1/2010 | Graber et al. | |
| 8,186,137 B2* | 5/2012 | Viaud | A01D 89/008 56/190 |
| 8,584,439 B2 | 11/2013 | Kuhn et al. | |
| 9,681,603 B2 | 6/2017 | McClure et al. | |
| 10,111,387 B1 | 10/2018 | Derscheid et al. | |
| 2008/0163600 A1* | 7/2008 | Schrag | A01D 89/008 56/341 |
| 2013/0167500 A1 | 7/2013 | Kuhn et al. | |
| 2014/0250855 A1 | 9/2014 | Vandamme et al. | |

* cited by examiner

AGRICULTURAL VEHICLE WITH WINDGUARD HAVING OFFSET ARMS

BACKGROUND OF THE INVENTION

The present invention pertains to agricultural vehicles and, more specifically, to agricultural vehicles that include a windguard.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a chassis, supported by wheels, a pickup unit to engage and lift the crop material into the baler, a cutting unit, a main bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the main bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

Many balers include a windguard, which holds down crop material as it is being fed to prevent it from being blown off the pickup floor and ensure adequate compaction of the crop material for appropriate feeding into the vehicle. In certain instances, known windguards interfere with crop material feeding into the vehicle.

What is needed in the art is a way to reduce the risk of a windguard interfering with crop material being fed into an agricultural vehicle.

SUMMARY OF THE INVENTION

Exemplary embodiments provided according to the present disclosure include a windguard assembly with a pair of arm assemblies that each include two arms that are laterally offset such that one of the arms is positioned laterally between a pair of vertical planes defined by endflares of a pickup assembly.

In some exemplary embodiments provided in accordance with the present disclosure, a feeding assembly for an agricultural vehicle includes: a frame; a pickup assembly carried by the frame and including a pickup roll, a plurality of tines carried by the pickup roll, and a pair of end flares, each of the end flares being disposed adjacent to a respective lateral end of the pickup roll and configured to redirect crop material picked up by the tines as the pickup roll rotates; and a windguard assembly including a windguard roll coupled to the frame by a pair of arm assemblies. Each of the arm assemblies includes: a first arm pivotably coupled to the frame; a second arm coupled to the first arm and the windguard roll; and an arm connector coupling the first arm to the second arm such that the second arm is laterally offset relative to the first arm and is positioned laterally between a pair of vertical planes defined by the end flares.

In some exemplary embodiments provided in accordance with the present disclosure, an agricultural baler includes: a chassis; a bale chamber carried by the chassis and configured to form a bale therein; a pickup assembly carried by the chassis and configured to convey crop material toward the baler, the pickup assembly including a pickup roll, a plurality of tines carried by the pickup roll, and a pair of end flares, each of the end flares being disposed adjacent to a respective lateral end of the pickup roll and configured to redirect crop material picked up by the tines as the pickup roll rotates; and a windguard assembly including a windguard roll coupled to the frame by a pair of arm assemblies. Each of the arm assemblies includes: a first arm pivotably coupled to the frame; a second arm coupled to the first arm and the windguard roll; and an arm connector coupling the first arm to the second arm such that the second arm is laterally offset relative to the first arm and is positioned laterally between a pair of vertical planes defined by the end flares.

One possible advantage that may be realized by exemplary embodiments provided according to the present disclosure is that the first arms and the second arms being laterally offset so the second arms are located within the vertical planes defined by the end flares reduces the risk of crop material pinching near the end flares, which can reduce the risk of plugging the pickup assembly.

Another possible advantage that may be realized by exemplary embodiments provided according to the present disclosure is that less pinching of crop material and clearance between the second arms and the end flares can increase the overall baling capacity of the vehicle.

Yet another possible advantage that may be realized by exemplary embodiments provided according to the present disclosure is that laterally offsetting the arms can reduce trash build up on the end flares.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
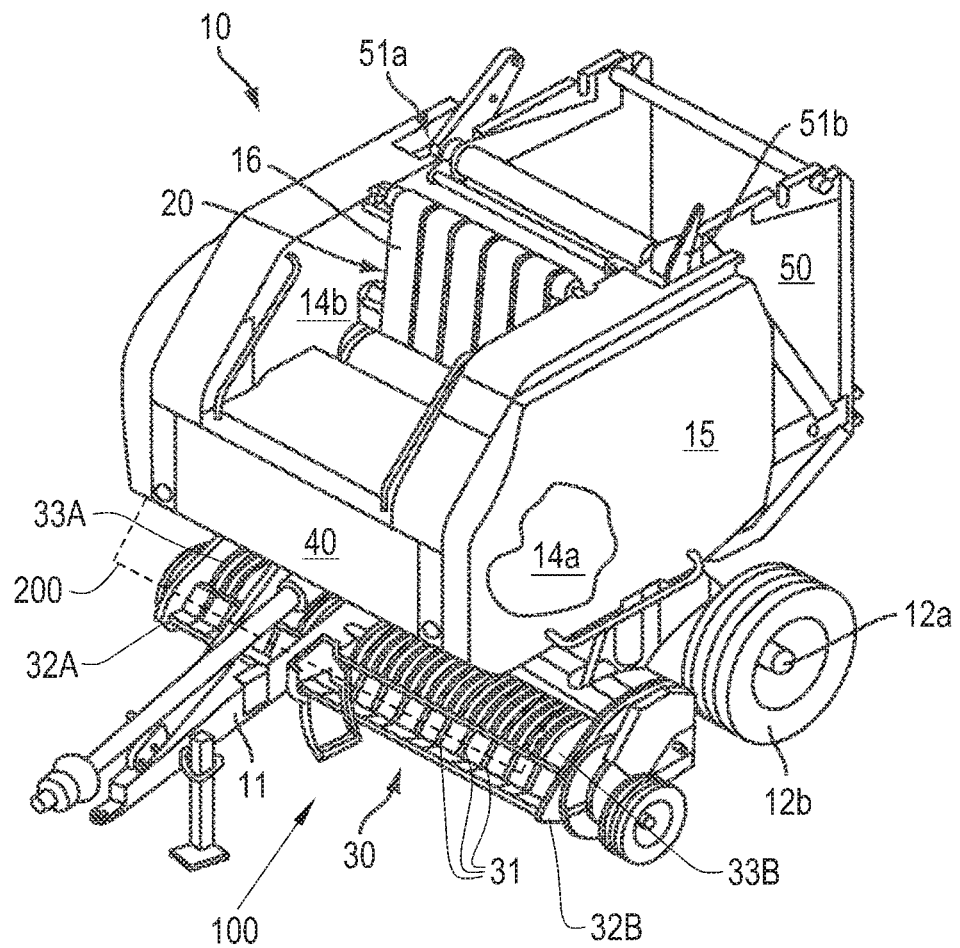
FIG. 1 illustrates a perspective view of an exemplary embodiment of an agricultural baler including a feeding assembly including a windguard assembly, provided in accordance with the present disclosure.
Figure 2:
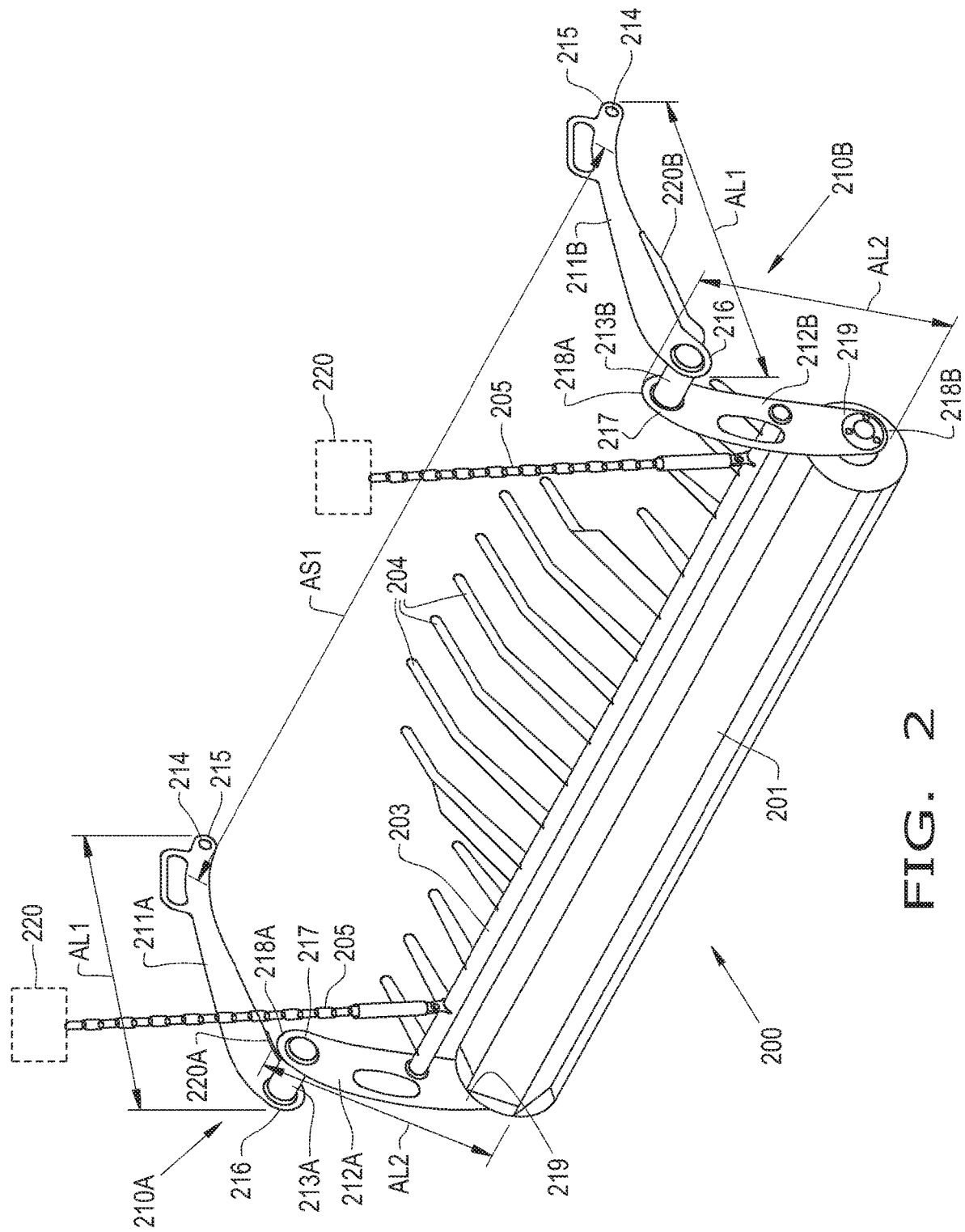
FIG. 2 illustrates a perspective view of the windguard assembly of FIG. 1.
Figure 3:
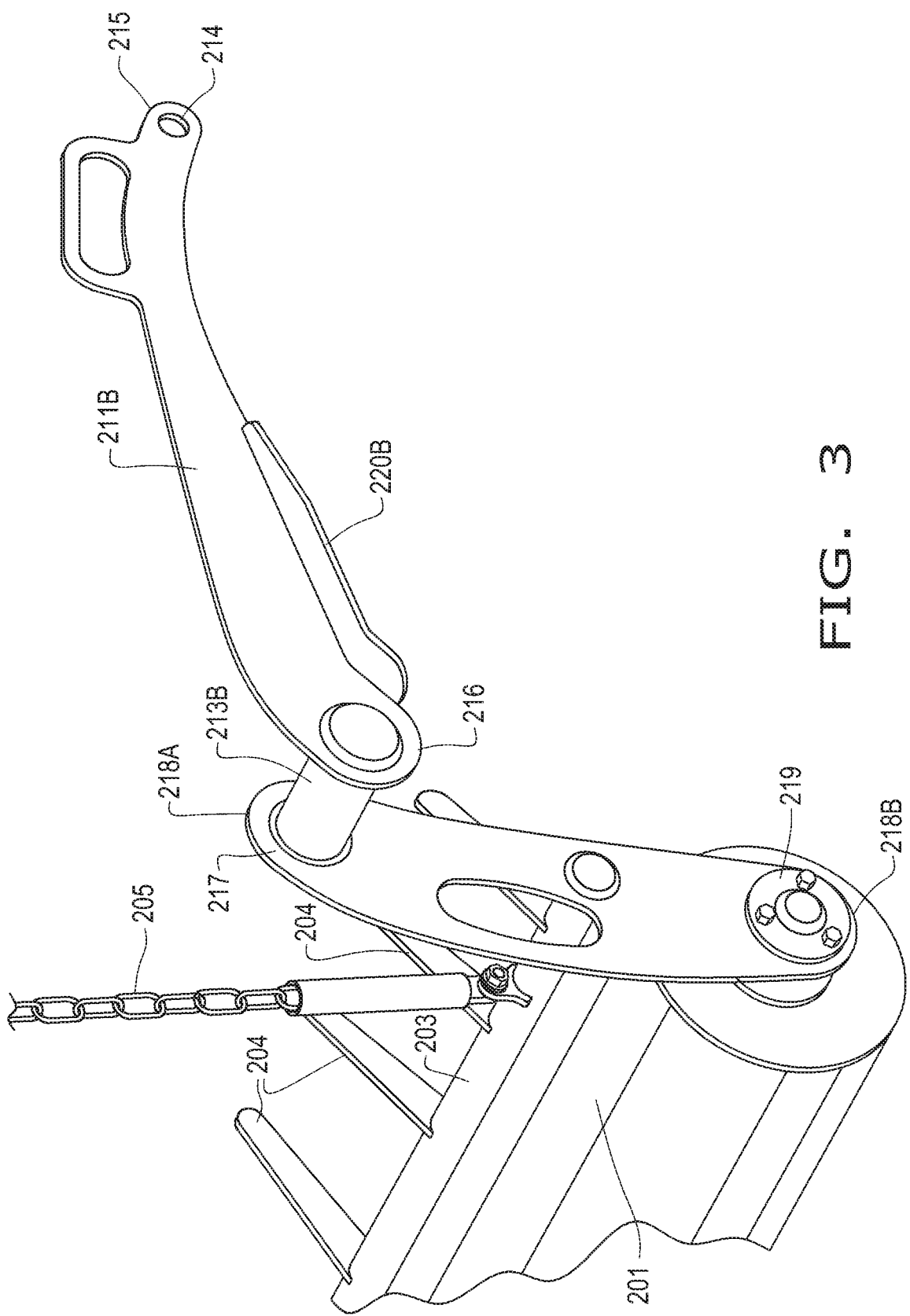
FIG. 3 illustrates a close-up perspective view of an arm assembly of the windguard assembly of FIGS. 1-2.

Referring now to the drawings, and more particularly to FIG. 1, an exemplary embodiment of a round baler 10 is shown to include a chassis terminating forwardly in a tongue 11 and rearward slightly beyond a transverse axle 12a to which a pair of wheels 12b (only one shown) is mounted, thus forming a wheel supported chassis. The chassis supports a series of belts 16 and floor rolls, which together with a first sidewall 14a (shown in the breakout) behind and generally parallel to cover panel 15 and a second sidewall 14b, collectively forming a bale chamber 20. Cut crop material is picked up by a pickup assembly 100 and fed through a harvesting assembly into the bale chamber 20 where it is formed into a cylindrically shaped bale by a series of conveyor belts 16. The pickup assembly 100 includes a transverse pickup roll 30 and a plurality of tines 31 carried by the pickup roll 30. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground. It should be appreciated that while the baler 10 is illustrated and described as a round baler, in some embodiments the baler 10 is configured as a square baler.

Figure 4:
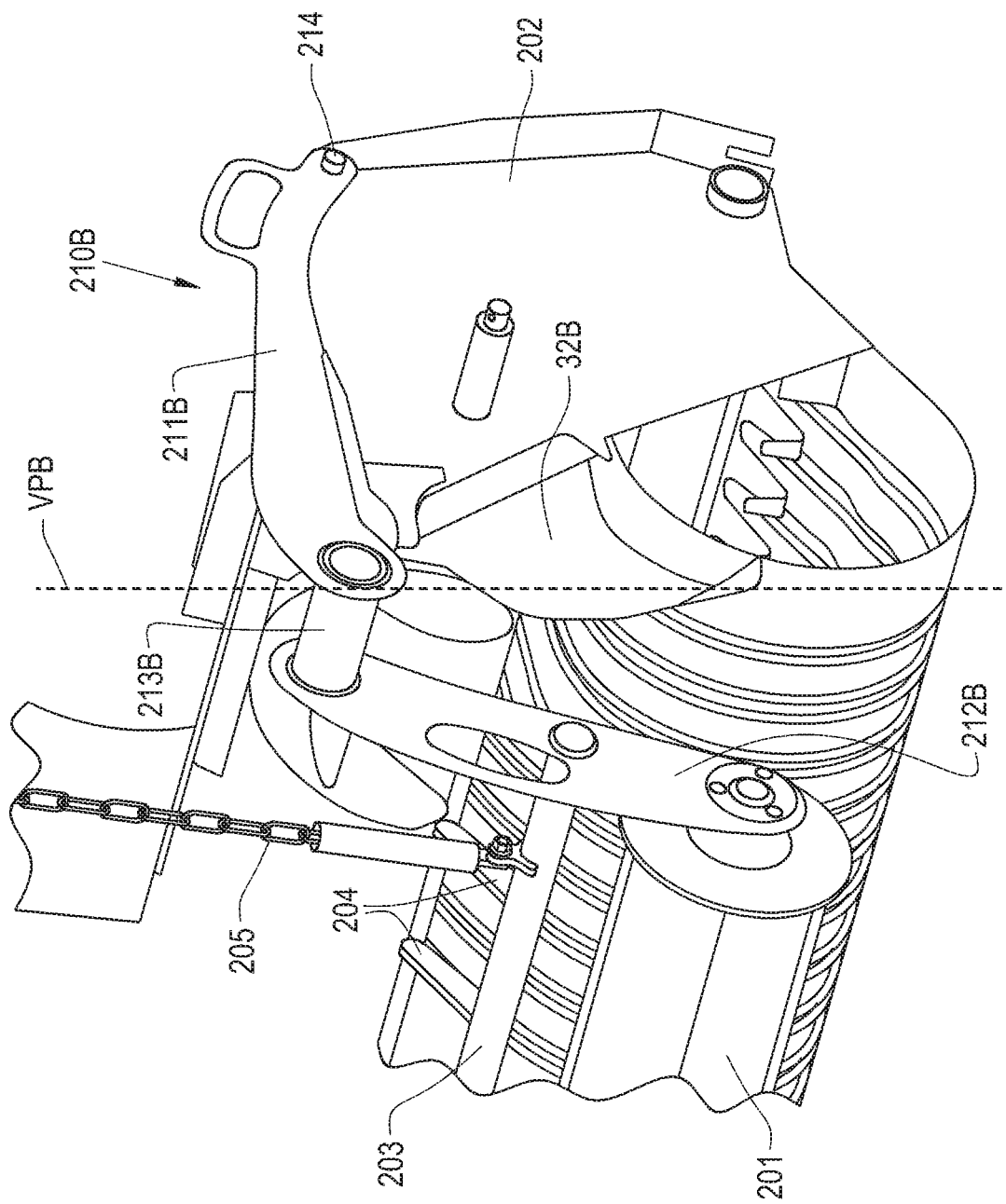
FIG. 4 illustrates a close-up perspective view of a portion of the feeding assembly of FIG. 1.
Figure 5:
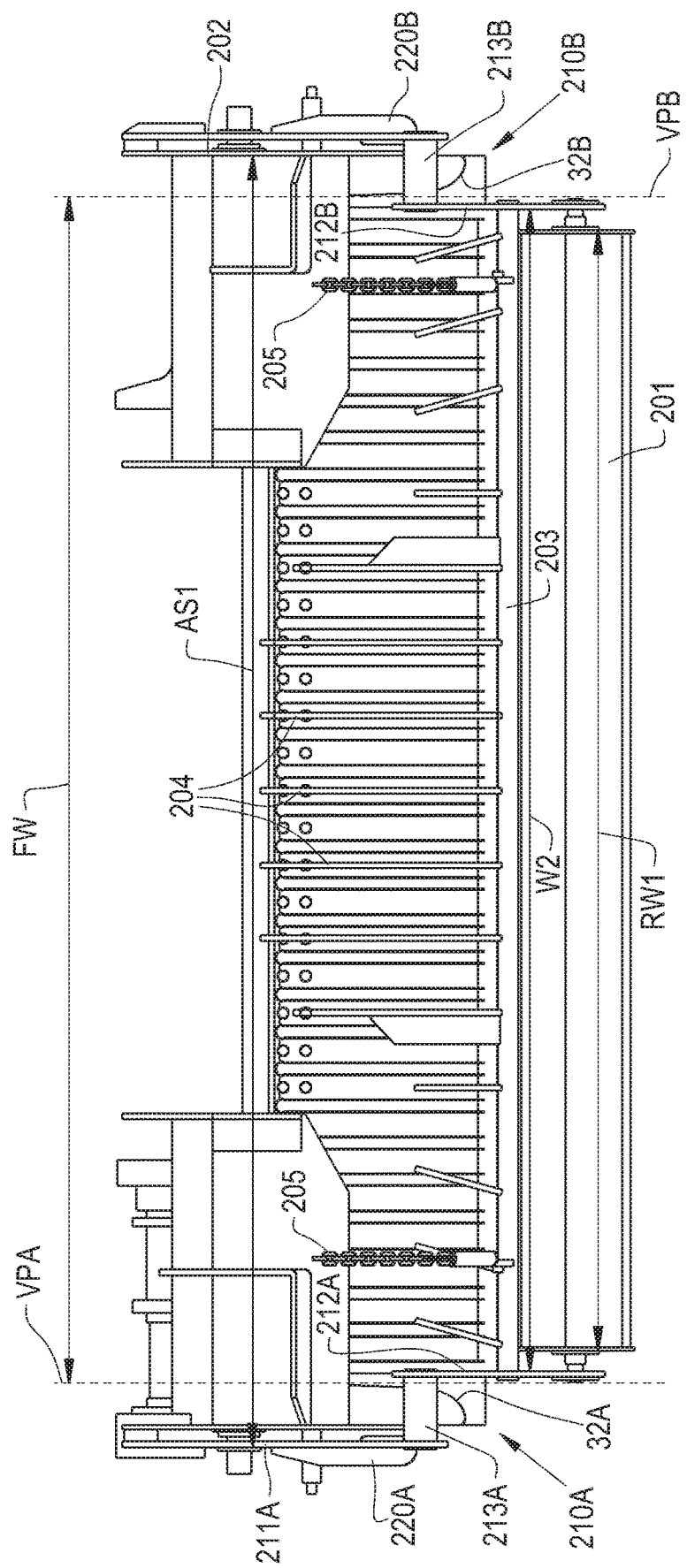
FIG. 5 illustrates a top view of the feeding assembly of FIGS. 1 and 4.
Figure 6:
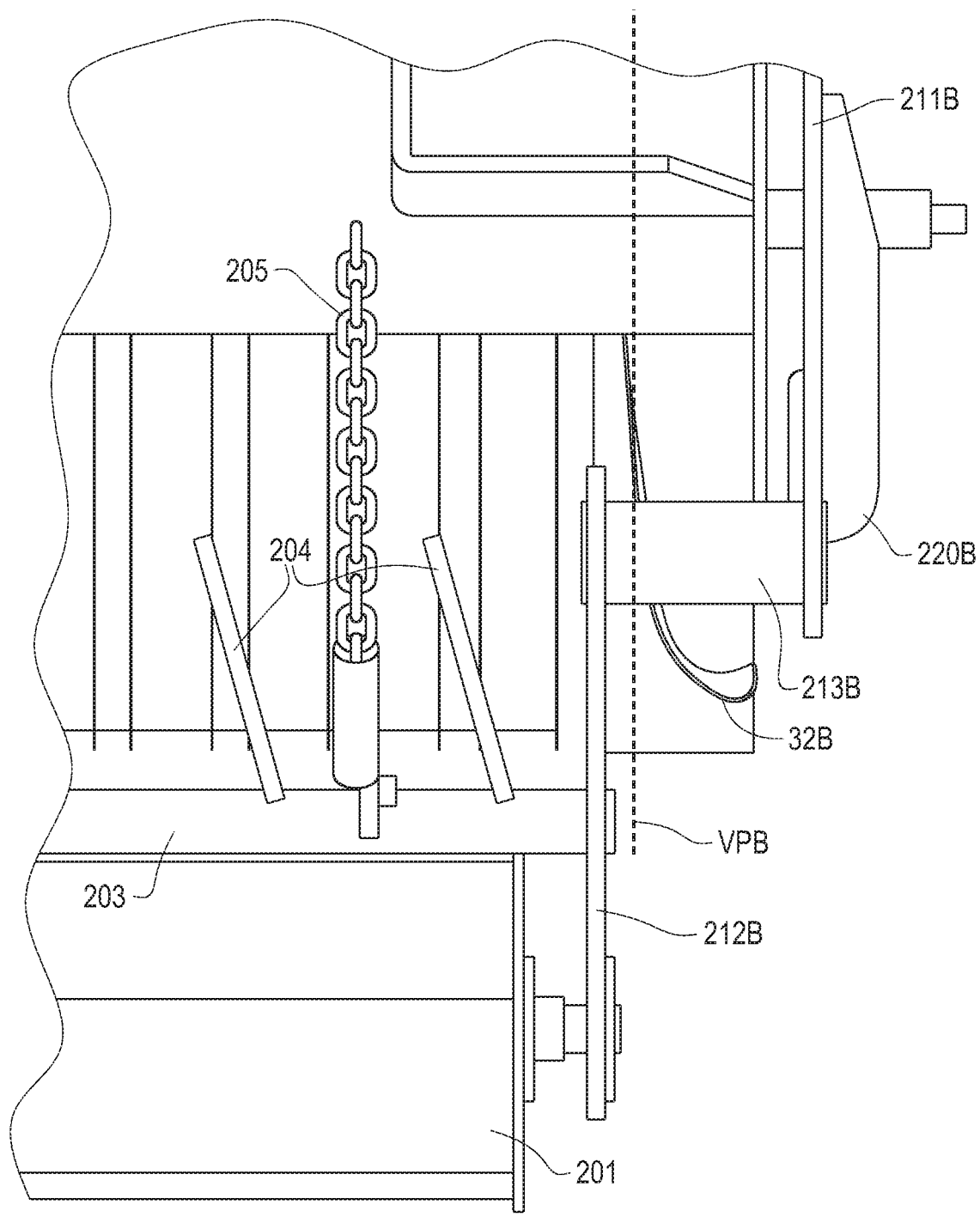
FIG. 6 illustrates a close-up top view of a portion of the feeding assembly of FIGS. 1 and 4-5.

The pickup assembly 100 includes a pair of end flares 32A, 32B, with each end flare 32A, 32B being disposed adjacent to a respective lateral end 33A, 33B of the pickup roll 30. One of the end flares 32A is illustrated in further detail in FIG. 4; it should be appreciated that the end flare 32B may be configured as a mirror image of the end flare 32A owing to its placement adjacent to the opposite lateral end 33B of the pickup roll 30. Each of the end flares 32A, 32B may be, for example, a curved plate or sheet of material that is shaped to redirect crop material picked up by the tines 31 as the pickup roll 30 rotates. The end flares 32A, 32B may be shaped to redirect the conveyed crop material toward the bale chamber 20, rather than allowing the conveyed crop material to be thrown back onto the field after being conveyed by the tines 31. As is known, the end flares 32A, 32B may be formed to have many different shapes, any of which may be used according to the present disclosure.

In many known balers, a windguard is included to prevent crop material from being blown away by the wind and also ensure adequate compacting during feeding of the crop material by the pickup assembly. Known windguards are relatively close to the pickup roll in order to provide adequate compaction. However, this proximity to the pickup roll places the windguard in close proximity to the end flares, which can lead to crop material pinching between the windguard and the end flares. The pinched crop material is not only unsightly, but can interfere with smooth feeding of crop material toward the bale chamber. In extreme cases, the pinched crop material can plug the pickup roll and severely reduce function of the pickup.

With further reference to FIG. 1, and referring now to FIGS. 2-6 as well, the baler 10 includes a windguard assembly 200 that includes a windguard roll 201 coupled to a frame 202 by a pair of arm assemblies 210A, 210B. Each of the arm assemblies 210A, 210B includes a first arm 211A, 211B pivotably coupled to the frame 202, a second arm 212A, 212B coupled to a respective first arm 211A, 211B and the windguard roll 201, and an arm connector 213A, 213B coupling the first arm 211A, 211B to the second arm 212A, 212B. Each of the arm connectors 213A, 213B are coupled to the respective arms 211A, 211B, 212A, 212B such that the second arms 212A, 212B are laterally offset relative to the respectively connected first arm 211A, 211B and positioned laterally between a pair of vertical planes VPA, VPB defined by the end flares 32A, 32B (illustrated in FIGS. 4-5). In this respect, the second arms 212A, 212B are positioned laterally inward of the end flares 32A, 32B, which allows the second arms 212A, 212B to both couple to the windguard roll 201 and be spaced from the end flares 32A, 32B by a sufficient distance to reduce the incidence of crop material getting stuck between the second arms 212A, 212B, as well as the coupled windguard roll 201, and the end flares 32A, 32B.

Each of the arms 211A, 211B, 212A, 212B may define a curved shape, with the shape and dimensions of the arms 211A, 211B, 212A, 212B being chosen to meet space requirements. The first arms 211A, 211B, for example, may each define a first arm length AL1 that is greater than a second arm length AL2 of the second arms 212A, 212B. The first arms 211A, 211B may couple to the frame 202 at a pivot 214, such as a pivot tube, adjacent to one end 215 and couple to the arm connectors 213A, 213B adjacent to an opposite end 216. As illustrated, the first arms 211A, 211B may be positioned so there is little, if any, vertical height difference between the ends 215, 216 of the first arms 211A, 211B.

As illustrated, the first arms 211A, 211B may be curved to provide a desired pivoting motion before a bottom of at least one of the first arms 211A, 211B comes into contact with at least one downward stop, illustrated as two downward stops 220A, 220B, located beneath one or both of the first arms 211A, 211B. The downward stops 220A, 220B are located beneath the first arms 211A, 211B and configured to limit downward movement of the first arms 211A, 211B, due to contact between the first arms 211A, 211B and the downward stops 220A, 220B, which also limits downward movement of the coupled seconds arms 212A, 212B and the windguard roll 201. The downward stops 220A, 220B may be positioned at whatever height is desired to define a minimum height of the windguard roll 201, relative to the ground.

The second arms 212A, 212B may connect to the arms connectors 213A, 213B at a first connection region 217 adjacent to a first end 218A of the second arms 212A, 212B and connect to the windguard roll 201 at a second connection region 219 that is adjacent to an opposite end 218B of the second arms 212A, 212B. As opposed to the first arms 211A, 211B, which have a relatively small difference in height between the opposite ends 215, 216, the ends 218A, 218B of the second arms 212A, 212B may have a substantial difference in height between the ends 218A, 218B. In some embodiments, for example, the difference in height between the ends 218A, 218B of the seconds arms 212A, 212B may be close in value, e.g., 85-100%, to the second arm length AL2 so the second arms 212A, 212B generally extend vertically. In this respect, the second connection region 218 of the second arms 212A, 212B may be vertically located below the first connection region 217. It should be appreciated that other arrangements of the arms 211A, 211B, 212A, 212B may be utilized according to the present disclosure to provide the desired positioning of the windguard roll 201.

In some embodiments, a second windguard element 203 is coupled to the second arms 212A, 212B. The second windguard element 203 may be a tube or solid section. The second windguard element 203 may include a plurality of windguard tines 204 and be connected to a pair of chains 205 that couple to one or more winch assemblies 220. The winch assembly 220 may rotate to pull or loosen the chains 205, which can adjust the height of the windguard roll 201 by causing pivoting of the first arms 211A, 211B via the connection to the second arms 212A, 212B. The second windguard element 203 may be disposed above and rearwardly of the windguard roll 201, i.e., the windguard roll 201 may be disposed forwardly and below the second windguard element 203. Using a winch assembly to adjust the height of a windguard roll is known, so further description is omitted for brevity.

In some embodiments, the first arms 211A, 211B are positioned laterally outward from the vertical planes VPA, VPB, and thus the end flares 32A, 32B, so the first arms 211A, 211B can pivotably couple to the frame 202 and allow pivoting of the arms 211A, 211B, 212A, 212B and the windguard roll 201. In this respect, the arm connectors 213A, 213B, which may be a tube or similar connector, may each cross a respective vertical plane VPA, VPB to couple the laterally outward first arms 211A, 211B and the laterally inward second arms 212A, 212B. In such an embodiment, the end flares 32A, 32B may define a flare separation width FW therebetween that is greater than a roll width RW1 defined by the windguard roll 201. The second windguard element 203 may define a second width W2 that is greater than the roll width RW1 of the windguard roll 201 but also less than the flare separation width FW. Such a configuration helps reduce the risk of crop material becoming pinched between the end flares 32A, 32B and the windguards roll/element 201, 203 as well as the second arms 212A, 212B. Further, the first arms 211A, 211B may define a first arm separation width AS1 therebetween that is greater than the flare separation width FW. Having the first arms 211A, 211B define a relatively greater first arm separation width AS1 allows mounting of the pivotable first arms 211A, 211B at a relatively wide position, which can provide more space to mount other components.

From the foregoing, it should be appreciated that laterally offsetting the first arms 211A, 211B and the second arms 212A, 212B can increase the clearance between components and reduce the risk of crop material getting trapped between the end flares 32A, 32B and the arms 211A, 211B, 212A, 212B as well as the windguard rolls 201, 203. The increased clearance can also result in an overall increased baling capacity due to more favorable crop material flow, especially near the end flares 32A, 32B. The lateral offset between the first arms 211A, 211B and the second arms 212A, 212B also allows a relatively wide mounting of the first arms 211A, 211B to the frame 202, which can lessen geometric constraints of certain components. Thus, the windguard assembly 200 provided according to the present disclosure can reduce the risk of crop material getting trapped and detrimentally affecting performance while also providing increased baling capacity and a favorable arm mounting orientation.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A feeding assembly for an agricultural vehicle, comprising:
   a frame;
   a pickup assembly carried by the frame and comprising a pickup roll, a plurality of tines carried by the pickup roll, and a pair of end flares, each of the end flares being disposed adjacent to a respective lateral end of the pickup roll and configured to redirect crop material picked up by the tines as the pickup roll rotates; and
   a windguard assembly comprising a windguard roll coupled to the frame by a pair of arm assemblies, each of the arm assemblies comprising:
      a first arm pivotably coupled to the frame;
      a second arm coupled to the first arm and the windguard roll;
      an arm connector coupling the first arm to the second arm such that the second arm is laterally offset relative to the first arm and is positioned laterally between a pair of vertical planes defined by the end flares; and
      wherein said second arm is oriented relative to said first arm so that the coupling of said second arm to the windguard roll is more radially outward from the pivotal coupling of said first arm to the frame than said arm connector on said first arm.

2. The feeding assembly of claim 1, wherein the arm connector comprises a tube.

3. The feeding assembly of claim 1, wherein the windguard roll defines a roll width and the end flares define a flare separation width therebetween that is greater than the roll width.

4. The feeding assembly of claim 3, wherein the first arms define a first arm separation width therebetween that is greater than the flare separation width.

5. The feeding assembly of claim 1, wherein each arm connector extends through a respective one of the vertical planes defined by the end flares.

6. The feeding assembly of claim 1, wherein the second arm couples to the first arm at a first connection region and to the windguard roll at a second connection region vertically located below the first connection region.

7. The feeding assembly of claim 1, wherein the windguard assembly further comprises a second windguard element coupled to the second arms.

8. The feeding assembly of claim 7, wherein the windguard roll is disposed forwardly of the second windguard element.

9. An agricultural vehicle, comprising:
   a chassis;
   a bale chamber carried by the chassis and configured to form a bale therein;
   a pickup assembly carried by the chassis and configured to convey crop material toward the bale chamber, the pickup assembly comprising a pickup roll, a plurality of tines carried by the pickup roll, and a pair of end flares, each of the end flares being disposed adjacent to a respective lateral end of the pickup roll and configured to redirect crop material picked up by the tines as the pickup roll rotates; and
   a windguard assembly comprising a windguard roll coupled to the frame by a pair of arm assemblies, each of the arm assemblies comprising:
      a first arm pivotably coupled to the frame;
      a second arm coupled to the first arm and the windguard roll;

an arm connector coupling the first arm to the second arm such that the second arm is laterally offset relative to the first arm and is positioned laterally between a pair of vertical planes defined by the end flares; and wherein said second arm is oriented relative to said first arm so that the coupling of said second arm to the windguard roll is more radially outward from the pivotal coupling of said first arm to the frame than said arm connector on said first arm.

10. The agricultural vehicle of claim 9, wherein the arm connector comprises a tube.

11. The agricultural vehicle of claim 9, wherein the windguard roll defines a roll width and the end flares define a flare separation width therebetween that is greater than the roll width.

12. The agricultural vehicle of claim 11, wherein the first arms define a first arm separation width therebetween that is greater than the flare separation width.

13. The agricultural vehicle of claim 9, wherein each arm connector extends through a respective one of the vertical planes defined by the end flares.

14. The agricultural vehicle of claim 9, wherein the second arm couples to the first arm at a first connection region and to the windguard roll at a second connection region vertically located below the first connection region.

15. The agricultural vehicle of claim 9, wherein the windguard assembly further comprises a second windguard element coupled to the second arms.

16. The agricultural vehicle of claim 15, wherein the windguard roll is disposed forwardly of the second windguard element.

* * * * *